United States Patent
Allgeuer et al.

(10) Patent No.: US 12,471,588 B1
(45) Date of Patent: Nov. 18, 2025

(54) WEED CONTROL MODULE AND DEVICE AND METHOD FOR LASER-BASED WEED CONTROL

(71) Applicant: Escarda Technologies GmbH, Berlin (DE)

(72) Inventors: Philipp Allgeuer, Berlin (DE); Viktor Gaus, Berlin (DE); Ragith Ayyappan Kutty, Berlin (DE); Eike Christian Muhra, Berlin (DE); Julio Cesar Pastrana Perez, Berlin (DE)

(73) Assignee: Escarda Technologies GmbH, Berlin (DE)

( * ) Notice: Subject to any disclaimer, the term of this patent is extended or adjusted under 35 U.S.C. 154(b) by 0 days.

(21) Appl. No.: 18/841,366

(22) PCT Filed: Feb. 5, 2024

(86) PCT No.: PCT/DE2024/150002
§ 371 (c)(1),
(2) Date: Aug. 24, 2024

(87) PCT Pub. No.: WO2024/165111
PCT Pub. Date: Aug. 15, 2024

(30) Foreign Application Priority Data

Feb. 10, 2023 (DE) .......................... 102023103252.6
Apr. 13, 2023 (DE) .......................... 202023101842.4

(51) Int. Cl.
*A01M 21/04* (2006.01)
*H05B 47/125* (2020.01)

(52) U.S. Cl.
CPC ........... *A01M 21/04* (2013.01); *H05B 47/125* (2020.01)

(58) Field of Classification Search
CPC .............................. A01M 21/04; A01B 39/18
See application file for complete search history.

(56) References Cited

U.S. PATENT DOCUMENTS

| 9,658,201 | B2 | 5/2017 | Redden et al. | |
| 2016/0205918 | A1* | 7/2016 | Chan | A01M 21/04 |
| 2016/0255778 | A1* | 9/2016 | Redden | A01M 21/04 |

(Continued)

FOREIGN PATENT DOCUMENTS

| EP | 2848120 A1 | 3/2015 |
| JP | 5188957 B2 | 4/2013 |
| WO | 0003589 A1 | 1/2000 |

*Primary Examiner* — Christopher D Hutchens
(74) *Attorney, Agent, or Firm* — Michael Soderman

(57) ABSTRACT

A laser-based weed control module (1) and a device and a method for laser-based weed control, which permit targeted control of weed plants (17) on agricultural areas (15) with high effectiveness and simultaneously high efficiency. The weed control module (1) comprises an image detection unit for providing three-dimensional image data, a laser unit (4) for generating and orienting a laser beam (5) and a data processing and control unit (6), wherein the data processing and control unit (6) contains a trained artificial intelligence that detects weed plants (17), identifies survival essential plant part of the weed plants (17) and controls the weed plants (17) by targeted laser-irradiation the survival essential plant part of the weed plants (17) in an environmentally friendly and chemical-free manner. The generated laser beam (5) has a light wavelength (A) in the range from 955 nm to 995 nm.

12 Claims, 10 Drawing Sheets

(56) References Cited

U.S. PATENT DOCUMENTS

| | | | |
|---|---|---|---|
| 2020/0120917 A1* | 4/2020 | Jackson | A01M 21/04 |
| 2021/0076662 A1* | 3/2021 | Mikesell | A01M 21/04 |
| 2021/0176981 A1* | 6/2021 | Correns | A01M 29/00 |
| 2022/0008889 A1* | 1/2022 | Jackson | A01M 21/04 |
| 2022/0117218 A1 | 4/2022 | Sibley et al. | |

* cited by examiner

WEED CONTROL MODULE AND DEVICE AND METHOD FOR LASER-BASED WEED CONTROL

CROSS REFERENCE TO RELATED APPLICATIONS

This application is the U.S. national stage of International Application No. PCT/DE2024/150002, filed on 2024 Feb. 5. The international application claims the priority of DE 102023103252.6 filed on 2023 Feb. 10 and the priority of DE 202023101842.4 filed on 2023 Apr. 13; all applications are incorporated by reference herein in their entirety.

BACKGROUND

The invention relates to a laser-based weed control module and a device and a method for laser-based control of weed plants on an agricultural area used for growing crops. The proposed technology enables environmentally friendly and chemical-free control of weeds on agricultural areas.

The methods for laser-based weeding are fundamentally based on eradicating weed plants on agricultural areas through targeted irradiation using a high-energy laser beam. The laser-irradiation leads to thermal decomposition of the plant substance and, as a result, to its biological elimination. Such a weed control method is described, for example, in WO 00/03589 A1.

In order to be able to control weeds with targeted laser-irradiation, it is first necessary to identify the weed among the plants grown on the agricultural area. This is usually done using an image capture and processing device that photographs an area of the agricultural area and analyses the captured image for characteristic plant characteristics. The identified plants are then divided into crops and weeds. In the next step, the identified weed plant is targeted using a laser unit that contains appropriate deflection and focusing units in its laser optics and irradiated or bombarded with a high-energy laser beam. The plants identified as crops or objects not identified as weeds are spared from the laser-irradiation.

Due to the required power density, laser systems based on carbon dioxide lasers are currently preferred for laser-based weed control. However, these are comparatively inefficient, require a large installation space and require a complex safety architecture. Due to these conditions, the machines are usually heavy and lead to mechanical stress on the soil when used in agriculture, which should be avoided as much as possible, especially during the growth phase of the crops, when weed control also takes place. In contrast to heavy agricultural harvesting equipment, weed control devices should be designed to put as little stress on the soil as possible. However, this is only partially possible when using carbon dioxide lasers for weed control.

To avoid the disadvantages of carbon dioxide lasers, alternative laser types, such as semiconductor lasers, can be used for laser-based weed control. The advantages of semiconductor lasers over carbon dioxide lasers are in particular the lower equipment costs, the possibility of guiding the beam using flexible light guides and the better efficiency. Devices and methods for laser-based weed control with semiconductor lasers are described, for example, in EP 2 848 120 A1 or US 2022/0117218 A1. However, even within semiconductor-based laser systems there are major differences in terms of effectiveness, efficiency, robustness and reliability.

SUMMARY

The invention relates to a laser-based weed control module (1) and to a device and a method for laser-based weed control, which permit targeted control of weed plants (17) on agricultural areas (15) with high effectiveness and simultaneously high efficiency. The weed control module (1) comprises an image detection unit for providing three-dimensional image data, a laser unit (4) for generating and orienting a laser beam (5) and a data processing and control unit (6), wherein the data processing and control unit (6) contains a trained artificial intelligence that detects weed plants (17), identifies survival essential plant part of the weed plants (17) and controls the weed plants (17) by targeted laser-irradiation the survival essential plant part of the weed plants (17) in an environmentally friendly and chemical-free manner. The generated laser beam (5) has a light wavelength (A) in the range from 955 nm to 995 nm.

DETAILED DESCRIPTION

The object of the invention is to provide a compact and robust semiconductor laser-based weed control device and a method for operating it, which enable targeted weed control in agricultural use with high effectiveness and simultaneously high efficiency.

This object is achieved by a weed control module having the features according to claim 1, a device for laser-based weed control according to claim 6 and a method for laser-based weed control according to claim 11. Appropriate further embodiments of the invention are described in claims 2 to 5, 7 to 10 and 12.

According to the invention, the weed control module for selectively controlling weed plants on an agricultural area used for the cultivation of crops has an image detection unit, a laser unit and a data processing and control unit, wherein the laser unit comprises a laser diode unit for generating a laser beam and a laser optics coupled to the laser diode unit via a light guide for beam deflection and beam focusing of the laser beam. The laser optics include, among other things, deflection units, such as movable mirrors, and focusing units, such as lens and mirror arrangements. The weed control module also comprises a housing which accommodates and encloses the image detection unit, the laser unit and the data processing and control unit.

The image detection unit comprises a stereo camera or is designed as such. The stereo camera is arranged in the housing in such a way that its optical axis or field of view is aligned with the agricultural area when used as intended. The stereo camera is configured to photographically record images in a predetermined image capture area on and above the agricultural area and to process them into three-dimensional image data. This means that the image data is available as pixels with three-dimensional coordinate assignment. The image capture rate of the stereo camera is usually in the range of 60 Hz to 90 Hz. The stereo camera preferably captures light in the visible spectral range, but can also be configured to capture other or additional spectral ranges, for example infrared or ultraviolet light.

The stereo camera and the laser optics are preferably arranged on the housing bottom side, so that both the field of view of the stereo camera and the field of view of the laser optics cover the area opposite the housing bottom side, i.e. a partial area of the agricultural area when used as intended. This partial area of the agricultural area defined by the image capture area is also referred to as the working area.

According to the invention, the data processing and control unit is configured to detect the weed plants and to distinguish them from the crops and other objects in the image capture area on the basis of the three-dimensional image data provided by the stereo camera by means of an artificial intelligence which is integrated in the data processing and control unit and which is trained on the basis of weed and crop image data. The data processing and control unit is also configured to use the trained artificial intelligence integrated in the data processing and control unit to identify at least one survival essential plant part for each weed plant detected and to determine its position data. Such survival essential plant part to be identified are, for example, the branching points of the plant shoots close to the ground in the transition area to the root. In germinating weed plants, this area where the cotyledons branch is connected by meristem, which is a particularly sensitive and survival essential part of the weed plant.

Furthermore, the data processing and control unit is configured to specifically control the identified survival essential plant part of each detected weed plant by means of the laser optics, wherein the control of the laser optics is carried out based on the position data of the identified survival essential plant part, and finally, after targeting the survival essential plant part of each detected weed plant, to trigger the laser beam for a predetermined irradiation duration to eliminate the respective weed plant.

The laser diode unit contains at least one laser diode (also called a semiconductor laser) that generates the laser light or the laser beam. According to the invention, the high-energy laser beam generated by the laser diode unit has a light wavelength in the range from 955 nm to 995 nm, preferably in the range from 965 nm to 985 nm. The light wavelength of 976 nm has proven to be particularly suitable. The laser power should be at least 300 W.

The device for laser-based weed control comprises at least one, but preferably several, of the described weed control modules. The device can also include, for example, carrier or travel units that serve to move the device on the agricultural area.

The method for laser-based weed control can be carried out or is carried out with one of the weed control modules described above or with the described device for laser-based weed control.

The weed control module or the device with the weed control modules is moved continuously or step by step over the agricultural area, with the field of view of the stereo camera of each of the weed control modules directed towards the agricultural area. During the traveling movement, the image capture area of the stereo camera moves continuously, so that new areas of the agricultural area, in which there are not only crops and weeds but also other objects typical in agriculture, are constantly coming into the field of view of the stereo camera. The direction of movement is conveniently selected so that the laser optics are behind the stereo camera in the direction of movement.

According to the method according to the invention, the sequence of method steps described below is carried out cyclically during movement over the agricultural are:

First, three-dimensional image data is determined from the current image capture area of the stereo camera, i.e., in the stereo camera, the images of the agricultural area recorded from the various viewing angles are processed into three-dimensional image data and transmitted to the data processing and control unit.

Using the artificial intelligence integrated in the data processing and control unit and trained using weed and crop image data, all weeds in the image capture area are detected on the basis of the three-dimensional image data- and thus distinguished from crops and other objects in the image capture area. For each weed plant detected, at least one survival essential plant part of the detected weed plant, for example the meristem at a branching point close to the ground or the root, is identified on the basis of the three-dimensional image data using the trained artificial intelligence integrated in the data processing and control unit, and the spatial position data of the identified survival essential plant part is determined for each of the detected weed plants. This means that the data processing and control unit detects all weed plants in the image capture area in one step and simultaneously tracks them in the form of the determined position data.

The detected weed plants are then iteratively selected for targeted elimination. The position data of the identified survival essential plant part of the selected weed plant is transmitted as target coordinates to the laser optics for control, i.e. for targeting the identified survival essential plant part of the selected weed plant.

After targeting, the laser irradiation or laser bombardment is finally triggered by the data processing and control unit, i.e. identified survival essential plant part of the selected weed plant is irradiated by the laser beam for the predetermined irradiation time. The preferred irradiation time when carrying out the method according to the invention is in the range of 10 ms to 50 ms.

All weed plants detected in the image capture area are eliminated iteratively, i.e. in the steps of selecting the next weed plant to be eliminating, then targeting it and finally irradiating it, until all detected weed plants have been irradiated. The next weed plant to be eliminated is selected based on suitability criteria, for example based on its spatial proximity to the previously eliminated weed plant or based on a currently suitable angle of incidence.

The proposed laser-based weed control technology uses lasers with a higher power density, namely semiconductor diode lasers with a light wavelength in the range of 955 nm to 995 nm, in conjunction with the targeted detection and laser irradiation of survival essential plant part of the weed plants—with the same effect but higher efficiency than with carbon dioxide laser-based laser systems. This low-intervention weed control technology provides a technically simple, energy-efficient and environmentally friendly weed control technology.

In the selected range of light wavelengths from 955 nm to 995 nm, the penetration depth of a laser beam in water is approximately 10 mm to 20 mm. Since weed plants usually consist largely of water, this penetration depth in water corresponds approximately to the penetration depth in the plant substance. One of the advantages of the selected light wavelength range is that the penetration depth of the laser beam is in the same size range as the usual size of the survival essential plant part to be thermally decomposed. When irradiated, the laser beam therefore covers approximately the entire survival essential plant part of the weed plant. When using lasers with a lower light wavelength, the irradiated plant part is larger, i.e. the laser beam penetrates the weed plant and may damage objects behind or underneath it. With a longer light wavelength, the penetration depth is small (for example 0.01 mm to 0.02 mm with a carbon dioxide laser). The low penetration depth into the plant substance of the weed plant must therefore be compensated by a less efficient longer irradiation time or multiple irradiations when using lasers with a higher light wavelength.

In addition to this penetration depth, which is favorable for weed control due to the selected light wavelength, the selected light wavelength range is also characterized by a local maximum of energy absorption in water. The faster heating of the water in the irradiated plant substance leads to its faster decomposition. Consequently, shorter irradiation times can be selected and a maximum level of energy efficiency can be achieved in weed control.

With the weed control technology according to the invention, for example, 85% to 90% less energy is required to introduce the same amount of energy into the plant substance compared to the use of carbon dioxide lasers.

According to one embodiment of the weed control module, its size-determining housing has a spatial extension that lies within the geometric dimensions of an imaginary cuboid of 80 cm long, 80 cm wide and 80 cm high. The housing is preferably cuboid-shaped and has a size of 40 cm to 60 cm long, 20 cm to 25 cm wide and 40 cm to 60 cm high. These dimensions are comparable to commercially available tower PCs. The weed control module configured in this way can therefore be easily handled; it can also be easily integrated into many other devices.

It can also be provided that a floor lighting panel is attached to the outer bottom side of the housing of the weed control module, which is equipped with lighting means, preferably with a large number of illuminants (lighting elements) distributed as evenly as possible. The illuminants are preferably light-emitting diodes that emit light in the detection spectrum of the stereo camera, i.e. in particular light in the visible spectral range. In order to avoid brightness patterns in the recorded images, the illuminants should preferably be selected so that they do not inherently flicker at frequencies close to the camera/shutter frequency. The direction of radiation of the illuminants is preferably aligned perpendicular to the housing bottom side. The arrangement of the illuminants is advantageously selected so that a largely homogeneous and diffuse light emission emanates from the housing bottom side.

A protective curtain can also be attached to the weed control module to shield against laser radiation. The protective curtain covers the area between the housing bottom side of the weed control module and the agricultural area. The protective curtain can be height-adjustable, or adaptively height-adjustable if necessary, in order to optimally shield the area between the housing bottom side and the agricultural area. In combination with the illuminants attached to the housing bottom side, the protective curtain also helps to ensure that only the light emitted by the illuminants is used when capturing images using the stereo camera. This suppresses disruptive external light influences from the environment.

It can also be provided that the weed control module has a water-cooling system. The water-cooling system is used in particular to cool the laser diode unit.

The device for laser-based weed control can have a chassis in addition to the weed control modules. The chassis can be externally driven, for example in the form of a trailer for an agricultural tractor, or it can be self-driven. Self-sufficiency or partial self-sufficiency is possible by photovoltaic elements. If several of the weed control modules are attached to the chassis, they are preferably installed in a parallel row across the direction of travel of the chassis.

The weed control modules can be arranged on or in a device for laser-based weed control such that the image detection areas of the stereo cameras of weed control modules arranged next to each other overlap or touch. This arrangement is preferably carried out in pairs of two weed control modules each. The overlap of the image capture areas makes it possible, for example, for one and the same weed plant to be detected in the overlap area by each of the two weed control modules. This means that the weed plant can be eliminated by both weed control modules. Depending on the orientation and positioning of the weed plant in relation to the respective laser optics, one of the two weed control modules can eliminate the weed plant more effectively, for example if the laser beam of one of the laser optics irradiates the identified survival essential plant part of the weed plant at a more favorable angle of incidence than the laser beam of the other laser optics. The arrangement of the weed control modules with touching image capture areas, on the other hand, makes it possible to achieve closed, as wide as possible coverage of the agricultural area to be treated in one pass.

In contrast to carbon dioxide laser systems, the space-saving, compact weed control modules can be installed in a wide row on a driving module. The weed control technology can thus be used in appropriately wide lanes on the agricultural area. The lower weight prevents damage to the soil and crops when driving over them; with wide coverage by a closed row of weed control modules, fewer passages over the agricultural areas are required. The low mass of the weed control module also enables it to be installed on heavy-duty drones.

The device for laser-based weed control can further comprise a rail system for holding laser-based weed control modules. The rail system makes it possible to install the weed control modules, adapted to the planting of an agricultural area, on a chassis of a device for laser-based weed control equipped with the described chassis, for example on an agricultural vehicle trailer.

The proposed rail system of the device for laser-based weed control comprises two carrier rail tracks that are aligned parallel to one another and form a carrier rail line which are preferably aligned transversely to the direction of movement when installed on a chassis, and one or more module carrier that are guided by sliding shoes on the carrier rail tracks. The module supports, in which the weed control modules are or are installed, are mounted on the sliding shoes and are installed so that they can be moved longitudinally on the carrier rail tracks. Preferably, each of the module carrier accommodates two weed control modules arranged parallel to one another.

Each module carrier is preferably mounted on three sliding shoes to ensure stable three-point support. Each of the sliding shoes clamps the carrier rail track assigned to it in a form-fitting manner, so that only a linear movement of the sliding shoes along the carrier rail track can take place. Each of the carrier rail tracks is preferably formed as a rail track made up of two parallel, interconnected carrier rails. The sliding shoe contacts the respective carrier rail on a sliding surface or sits on the carrier rail. The sliding surface can be coated with a sliding coating (either on the sliding shoe and/or rail side) (for example with a polytetrafluoroethylene coating). The module carriers are detachably attached to the sliding shoes, usually by screw connections. At least one of the sliding shoes assigned to a specific module carrier is provided with a detachable fastening element, for example a locking screw, to lock the sliding shoe (and thus the module carrier) in a specific longitudinal position on the carrier rail tracks.

The module carrier is designed like a trough to accommodate the weed control modules, with recesses on the bottom wall for the stereo camera and the laser optics of the respective weed control module. To protect the weed control modules, a protector cap or a protector cover, here referred to as a protector lid, can be attached to the module carrier. Together with the protector lid, the module carrier, also referred to as the protector trough, forms the module protector, which protects the weed control modules from contamination and damage.

The module carriers with the weed control modules inside them are installed on the carrier rail line so that they can be moved lengthways and can thus be installed next to each other, in a specified number and at a specified distance. This enables the weed control modules to be arranged in a way that is tailored to the planting of the agricultural area, in particular the spacing between the rows of crops.

The chassis is designed as a strut construction that provides an optimal field of vision below the carrier rail line. Otherwise, it has a design that is typical for agricultural equipment. It is preferably designed as a vehicle trailer for agricultural tractors. The base construction of the chassis, to which the carrier rail tracks are attached, can be height-adjustable relative to the wheels.

According to one embodiment, the weed control modules are mounted on module rails within each module carrier so that they can be moved longitudinally. For this purpose, the module rails are attached in pairs to two opposite housing walls of the weed control module using module rail holders or retaining tabs, with the two module rails attached to opposite walls on the weed control module being aligned parallel to one another. The module rails also preferably run parallel to the carrier rail tracks.

Each module rail is guided and held in two sliding guide and clamping elements that are spaced apart from one another and attached to the module carrier. By clamping the sliding guide and clamping elements, the position of the module rails and thus the position of the weed control modules within the module carrier is fixed. The module rails therefore serve as adjustable holders for the weed control module within the module carrier.

The module rails can be used to flexibly adjust the distance between the two weed control modules located within a module carrier. This enables the weed control modules to be arranged in a way that is optimal for weed control.

BRIEF DESCRIPTION OF THE DRAWINGS

The invention is explained in more detail below using exemplary embodiments and with reference to the schematic drawings, in which identical or similar features are provided with identical reference numerals. Show this.

DETAILED DESCRIPTION OF THE PREFERRED EMBODIMENTS

Figure 1:
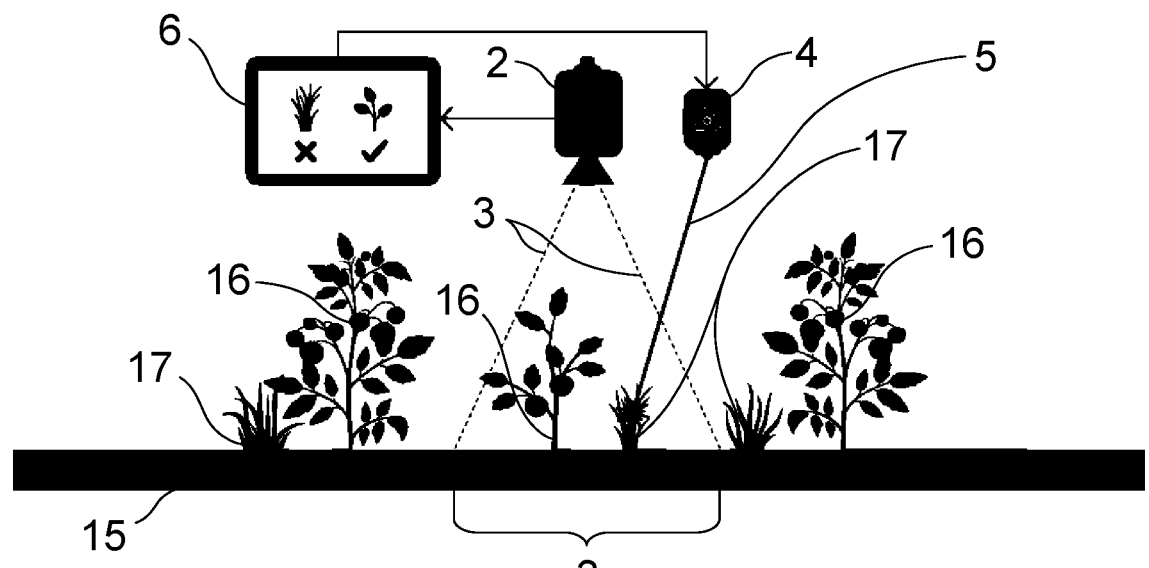
FIG. 1: the principle of laser-based weed control in sectional view.

The method for laser-based weed control is illustrated in FIG. 1: On an agricultural area 15, next to the crops 16, there are the weed plants 17 to be controlled. To eliminate the weed plants 17, the weed control module 1 or the device for laser-based weed control, which is represented in FIG. 1 by three of its components, namely the stereo camera 2, the data processing and control unit 6 and the laser unit 4, is continuously moved or displaced over the agricultural area 15.

In the current image detection area 3 of the stereo camera 2 according to FIG. 1 there is one crop 16 and one weed plant 17. Using the stereo camera 2, images are captured from two angles in the image detection area 3, processed into three-dimensional image data and the three-dimensional image data is transmitted to the data processing and control unit 6. The data processing and control unit 6 is configured to detected and differentiate the crop 16 as well as the weed plant 17 in the current image capture area 3 using the trained artificial intelligence. Furthermore, the artificial intelligence integrated in the data processing and control unit 6 is configured to identify survival essential plant part of the weed plant 17. These are in particular the branching points of the weed plant 17 near the roots, consisting of meristem. The data processing and control unit 6 is further configured to determine the position of the identified survival essential plant part detected weed plant 17 from the three-dimensional image data provided by the stereo camera 2 and to transmit it to the laser unit 4.

After the image data acquisition and processing has been completed, the deflection and focusing units in the laser optics 4.1 of the laser unit 4 are controlled by the data processing and control unit 6 in such a way that the identified survival essential plant part of the weed plant 17 is targeted. As soon as the setting of the laser unit 4, i.e. the targeting, is completed, the laser beam 5 is activated for the specified irradiation duration of, for example, 30 ms. The weed plant 17 is thereby thermally decomposed in the area of the targeted survival essential plant part; the weed plant 17 is therefore no longer biologically viable. By irradiating with the laser beam 5, the weed plant 17 is also regularly optically changed in such a way that it is no longer detected as a weed plant 17 by the trained artificial intelligence. If the weed plant 17 is still recognized as a weed plant 17 after a possibly imprecise laser beam irradiation, the laser beam 5 irradiates again (possibly only after another pass). Weed control is carried out in this way until all weed plants 17 in the image detection area 3 that moves forward over the agricultural area 15 during the movement of the weed control device have been eliminated. This control inherent in the process ensures that all viable weed plants 17 on the agricultural area 15 are eliminated.

Figure 2:
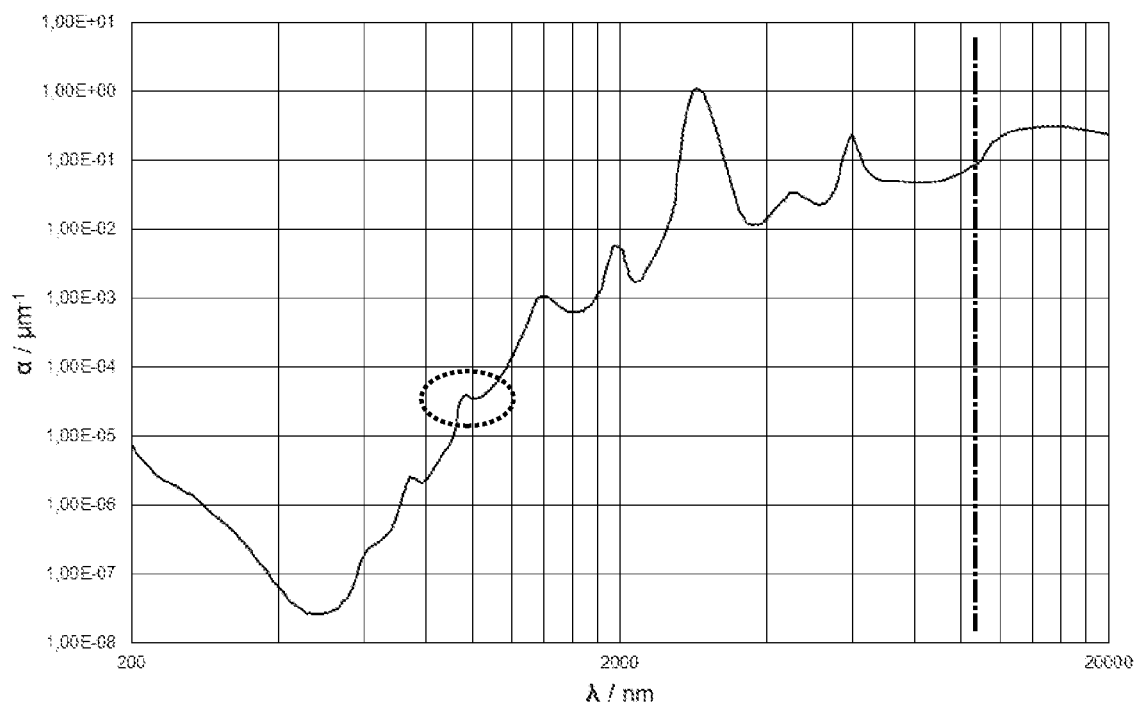
FIG. 2: a diagram of the course of the energy absorption of laser radiation in water as a function of the light wavelength.

FIG. 2 shows the course of the absorption coefficient $\alpha$ of the energy absorption of laser radiation in water as a function of the light wavelength $\lambda$. The light wavelength $\lambda$ from 955 nm to 995 nm of the laser beam 5 generated by the laser diode unit 4.2 lies within the field circled in the diagram. As can be seen, the light wavelength $\lambda$ selected according to the invention lies in the region of a local maximum of the absorption coefficient $\alpha$. This means that more energy is absorbed by the water contained in the irradiated plant substance than in the immediate vicinity of the selected wavelength range. The associated faster heating of the plant water leads to a faster thermal decomposition of the plant substance at the position irradiated with the laser beam 5. For comparison purposes, the light wavelength $\lambda$ of a carbon dioxide laser is shown as a dash-dot line in FIG. 2.

Figure 3:
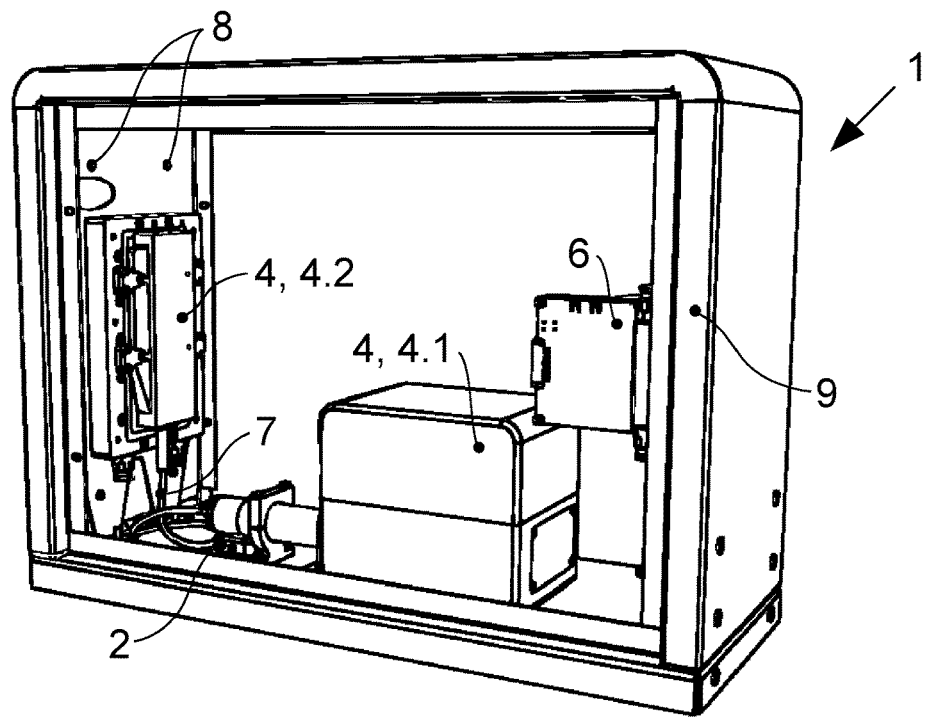
FIG. 3: the weed control module without side walls in a first perspective view.
Figure 4:
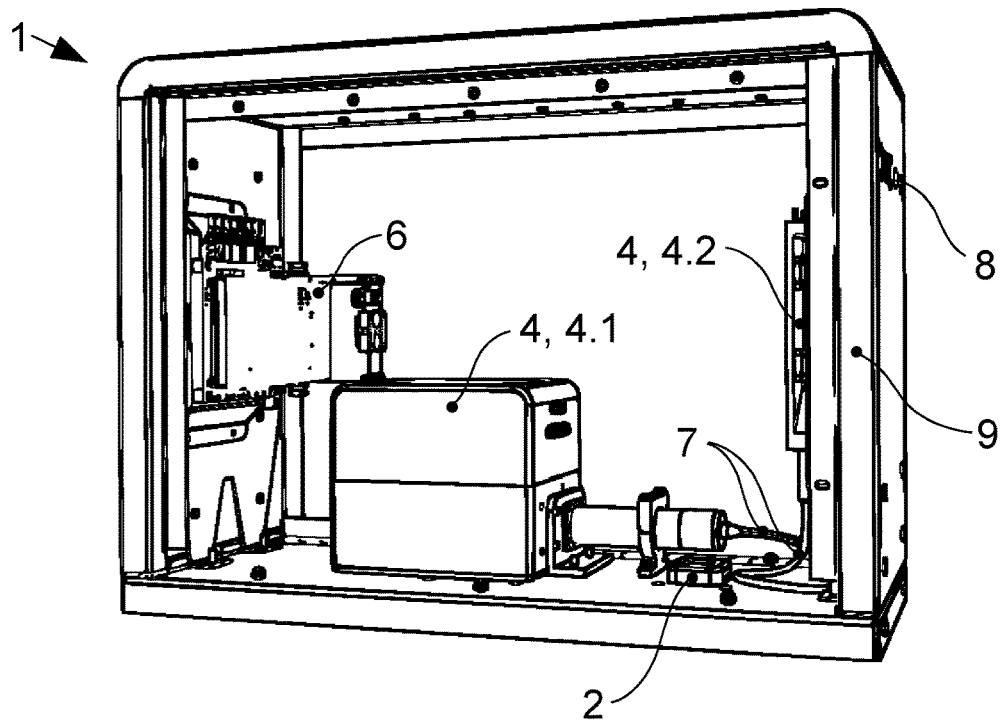
FIG. 4: the weed control module without side walls in a second perspective view.
Figure 5:
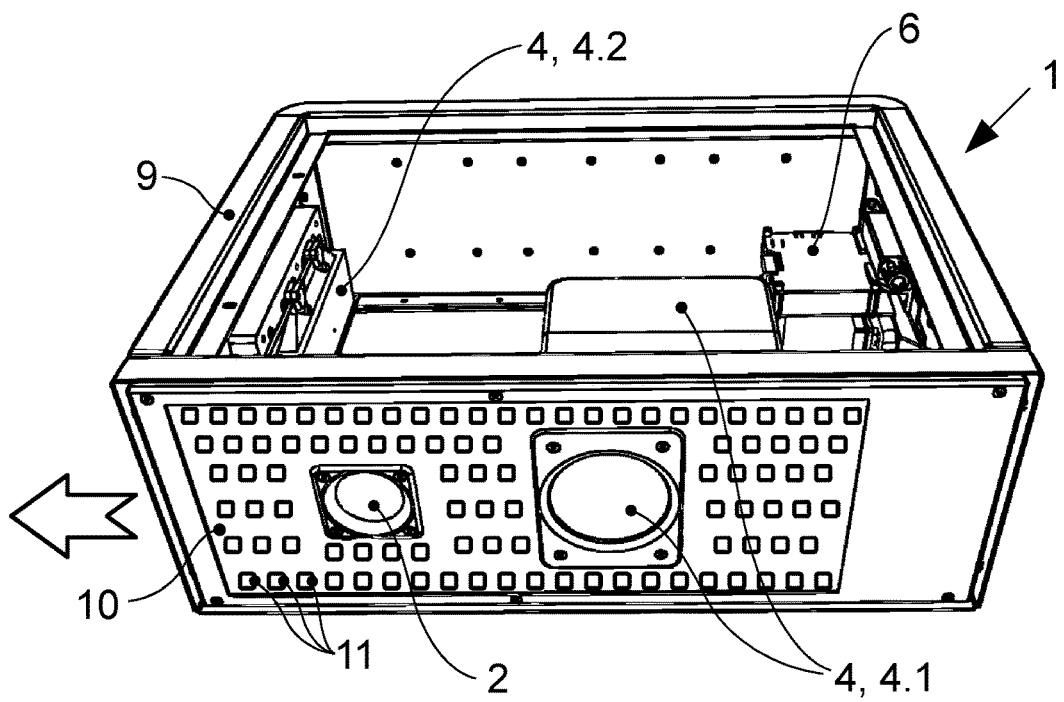
FIG. 5: the weed control module without side walls in a third perspective view.

The weed control module 1 according to the illustrations in FIG. 3 to FIG. 5 has a cuboid-shaped housing 9 with a length of 50 cm, a width of 22 cm and a height of 42-43 cm, i.e. a format similar to that of commercially available midi tower PCs. When used as intended, the housing is covered on all sides; in the Illustrations in FIG. 3 to FIG. 5, the weed control module 1 is shown without side walls or side panels to make the internal structure visible.

The stereo camera 2 and the laser optics 4.1 are mounted on the inside of the bottom side of the housing 9. The main optical axes of the stereo camera 2 and the laser optics 4.1 are aligned in a row and perpendicular to the housing bottom side, i.e. when used as intended, they are directed perpendicularly to the agricultural area 15. The laser beam 5 generated by the laser diode unit 4.2 is coupled into the laser optics 4.1 via the light guide 7. The data processing and control unit 6 is connected in a known manner to the other components, in particular the stereo camera 2, the laser optics 4.1 and the laser diode unit 4.2, via data or power lines. The laser diode unit 4.2 and possibly other components are cooled by means of a water-cooling system; the water-cooling system is supplied via the water-cooling connection 8 in the housing 9.

The laser diode unit 4.2 has a laser diode that generates a laser beam 5 with a light wavelength $\lambda$ of 976 nm; the laser power is approximately 400 W.

The representation of the visible outer housing bottom side of the weed control module 1 in FIG. 5 illustrates the arrangement of the stereo camera 2 and the laser optics 4.1. The arrow indicates the direction of movement of the weed control module 1 when used as intended. The floor lighting panel 10 is also attached to the housing base, which carries a large number of illuminants 11, in the example light-emitting diodes.

Figure 6:
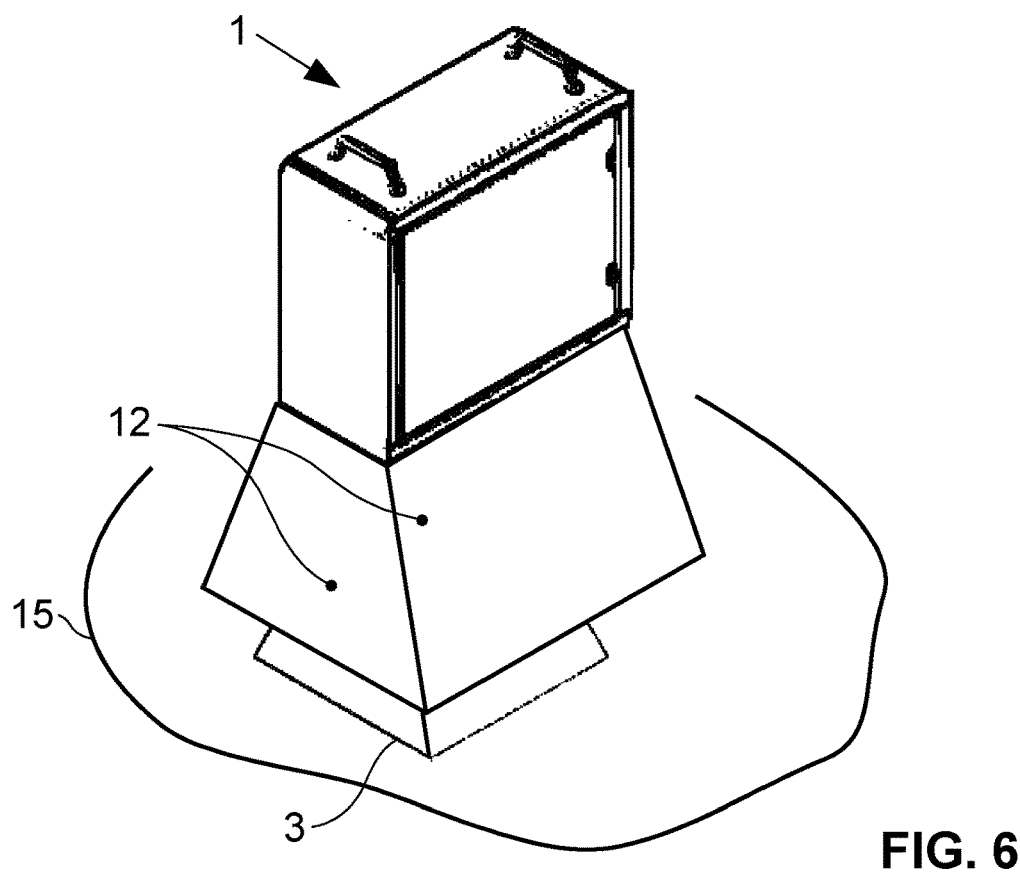
FIG. 6: the weed control module with protective curtain in perspective view.

FIG. 6 illustrates the intended installation of the weed control module 1 when carrying out weed control. The weed control module 1 has two handles on the top for easier handling. The housing bottom side of the weed control module 1 is aligned horizontally and arranged at a distance of approximately 50 cm above the agricultural area 15. The image detection area 3 extends over a rectangular area on the agricultural area 15, i.e. the work area, the edge lengths of which are in the range of 30 cm to 40 cm.

In order to prevent the laser beam 5 from escaping when irradiating the weed plants 17 in the working area, the protective curtain 12 is attached to the weed control module 1, which shields the area between the housing bottom side of the weed control module 1 and the agricultural area 15 against the escape of laser radiation into the environment.

Figures 7, 8:
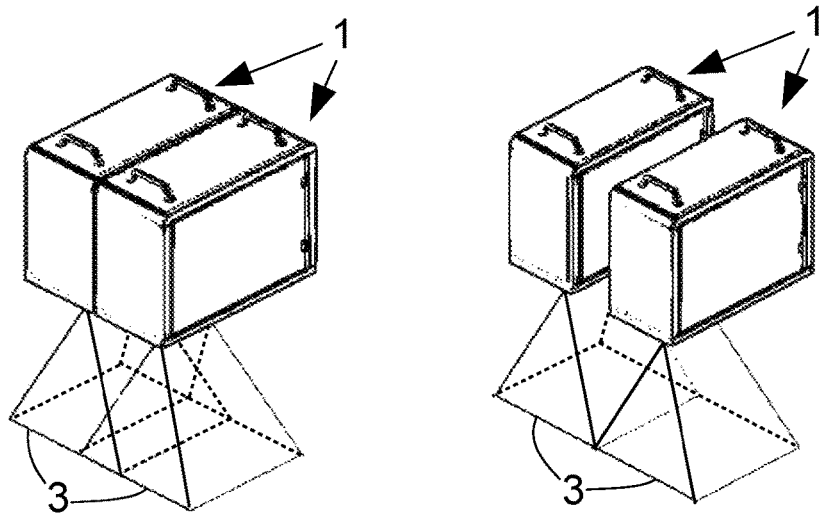
FIG. 7: two weed control modules with overlapping image capture areas in perspective view.
FIG. 8: two weed control modules with adjacent image capture areas in perspective view.

FIG. 7 and FIG. 8 show two possible arrangements of weed control modules 1 within a device for laser-based weed control. The two weed control modules 1 are each aligned with their long sides parallel to one another. In FIG. 7, the weed control modules 1 are in contact with one another, which results in an overlap of the two image detection areas 3. This makes it possible, for example, for weed plants 17 located in the overlap area to be detected and irradiated from different angles. In FIG. 8, on the other hand, the weed control modules 1 are spaced apart from one another and arranged next to one another in such a way that the image detection areas 3 are directly adjacent to one another. This arrangement ensures maximum area coverage with weed control modules 1 arranged in a row.

Figure 9:
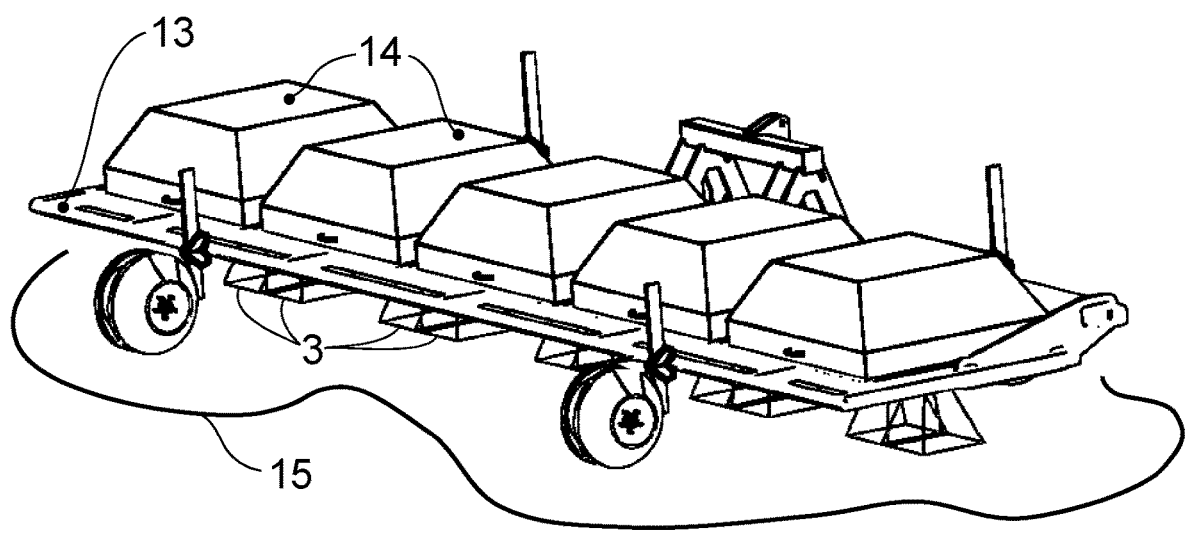
FIG. 9: an embodiment of the device for laser-based weed control on an agricultural vehicle trailer in perspective view.
Figure 10:
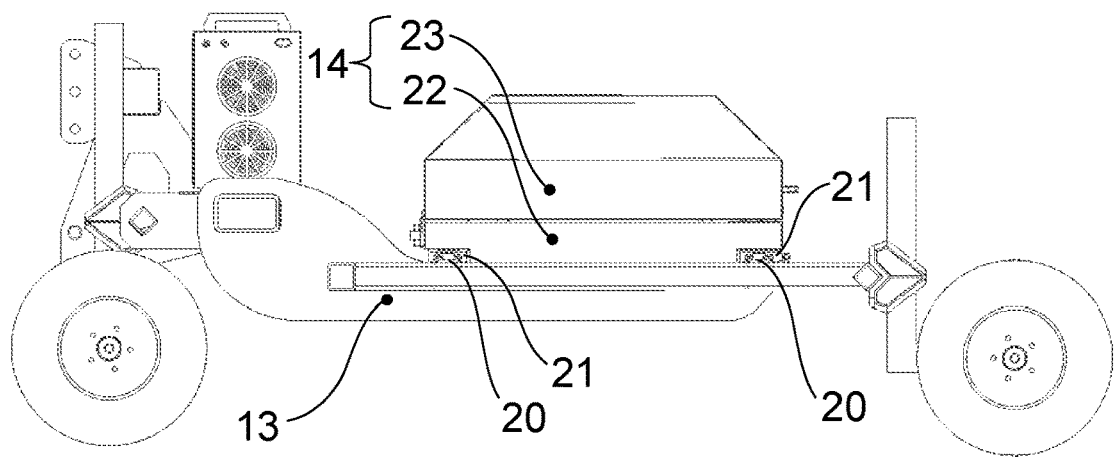
FIG. 10: an embodiment of the device for laser-based weed control with rail system on an agricultural vehicle trailer in side view.
Figure 11:
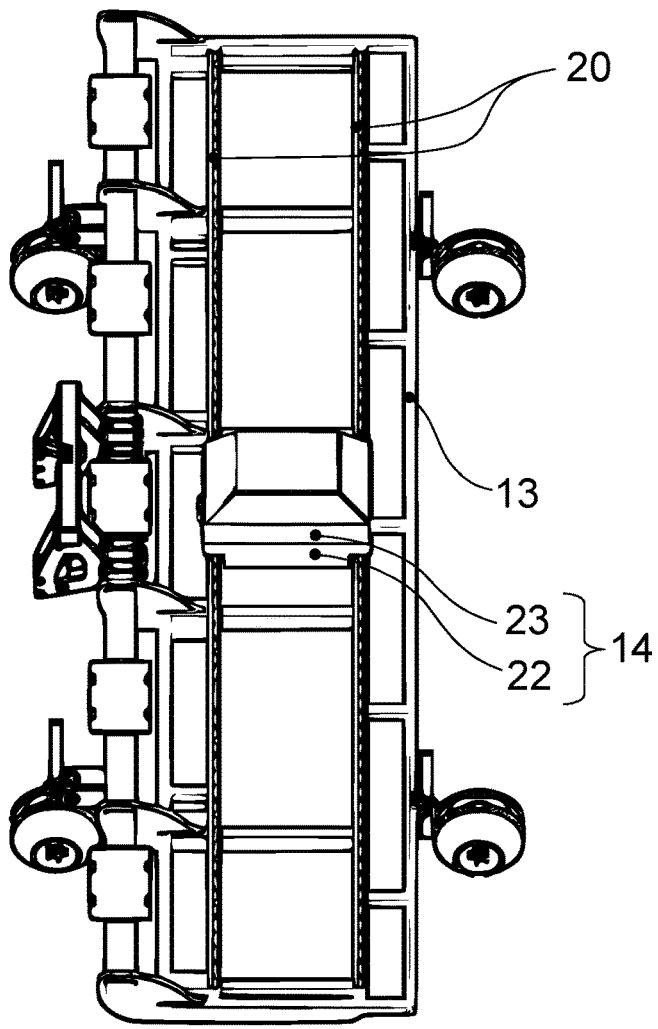
FIG. 11: an embodiment of the device for laser-based weed control with rail system on an agricultural vehicle trailer in side view.

A device for laser-based weed control designed for agricultural use as a vehicle trailer is shown in FIG. 9. Ten weed control modules 1 arranged in pairs in a row (not visible) are installed on the chassis 13 of the trailer. One pair of weed control modules 1 is located under each of the module protectors 14, which protect the weed control modules 1 from the usual environmental influences from agricultural operations, such as dirt, dust, splash water, etc.

FIG. 10 to FIG. 15 show a device for laser-based weed control with a rail system designed for agricultural use as a vehicle trailer. The two carrier rail tracks 20 are attached to the chassis 13 transversely to the direction of movement of the vehicle trailer. The module carrier 22, together with the protector lid 23, forms the module protector 14 for holding and protecting the weed control modules 1. The module carrier 22 is attached to the sliding shoes 21, which in turn are guided longitudinally displaceable on the carrier rail tracks 20.

Figure 12:
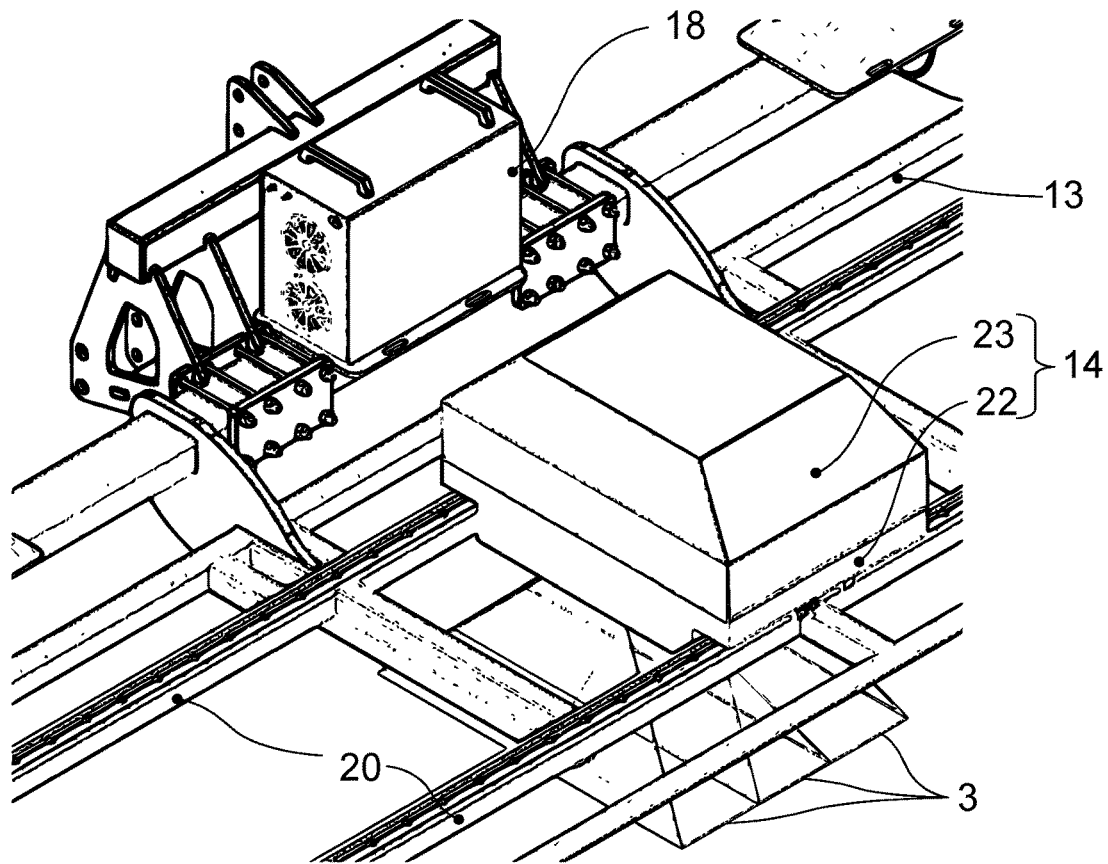
FIG. 12: details of the embodiment of the device for laser-based weed control with rail system on an agricultural vehicle trailer in perspective view from above.

The detailed illustration according to FIG. 12 additionally shows the cooling unit 18 used to cool the weed control modules 1 and also shows the image detection areas 3 of the two weed control modules 1 installed in the module protector 14.

Figure 13:
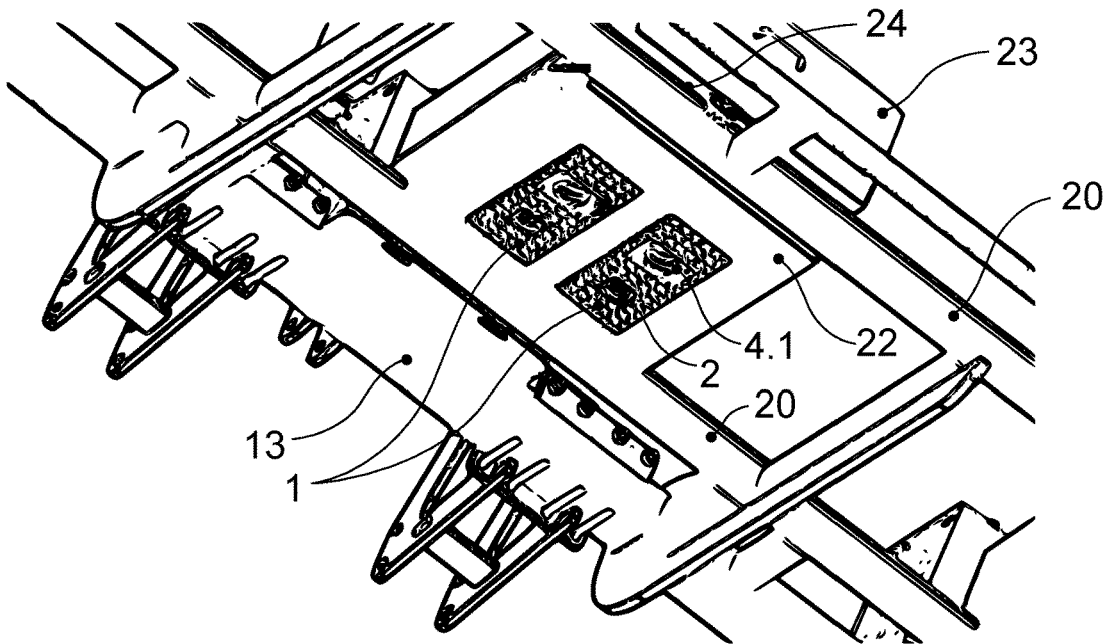
FIG. 13: details of the embodiment of the device for laser-based weed control with rail system on an agricultural vehicle trailer in perspective view from below.

FIG. 13 shows the recesses in the bottom wall of the module carrier 22, which provide the field of view for the stereo cameras 2 and the laser optics 4.1 of the two weed control modules 1.

Figure 14:
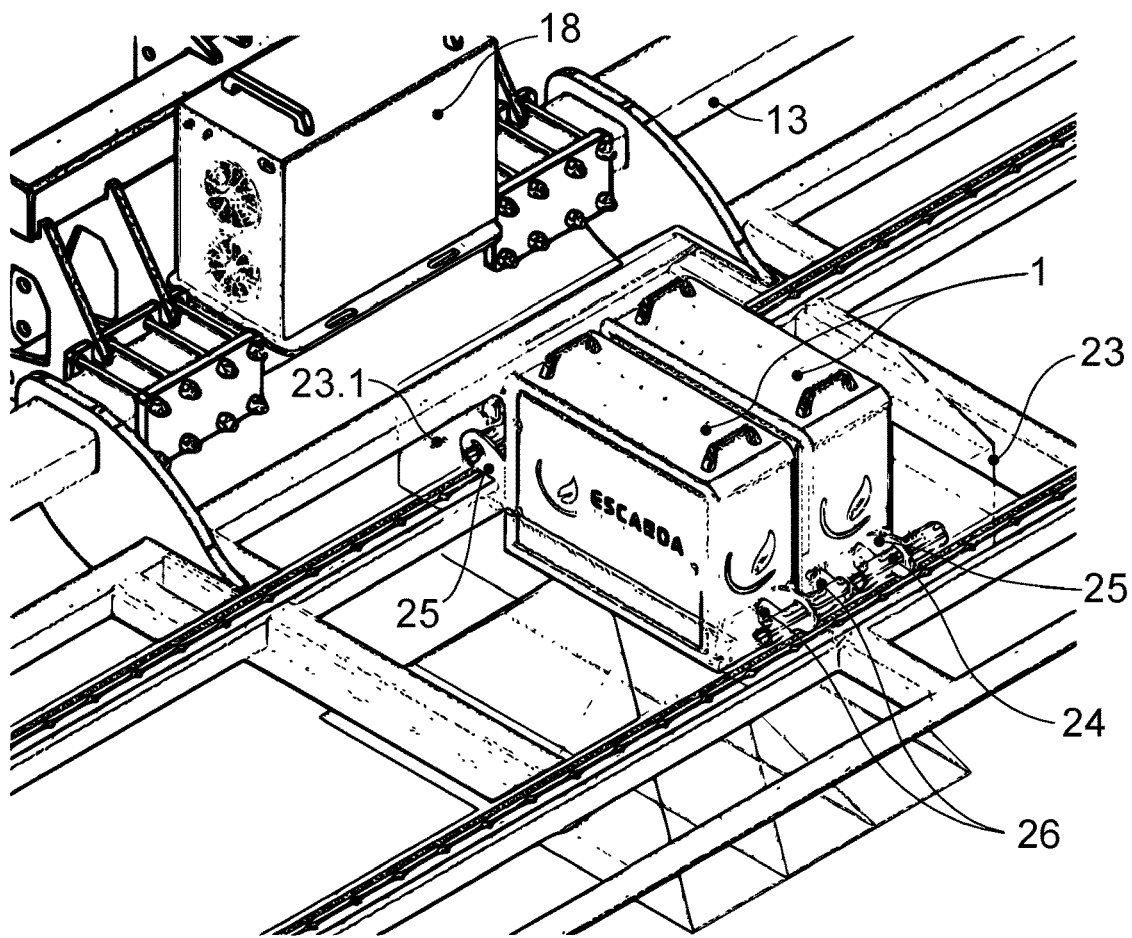
FIG. 14: details of the embodiment of the device for laser-based weed control with rail system on an agricultural vehicle trailer in perspective view from above.
Figure 15:
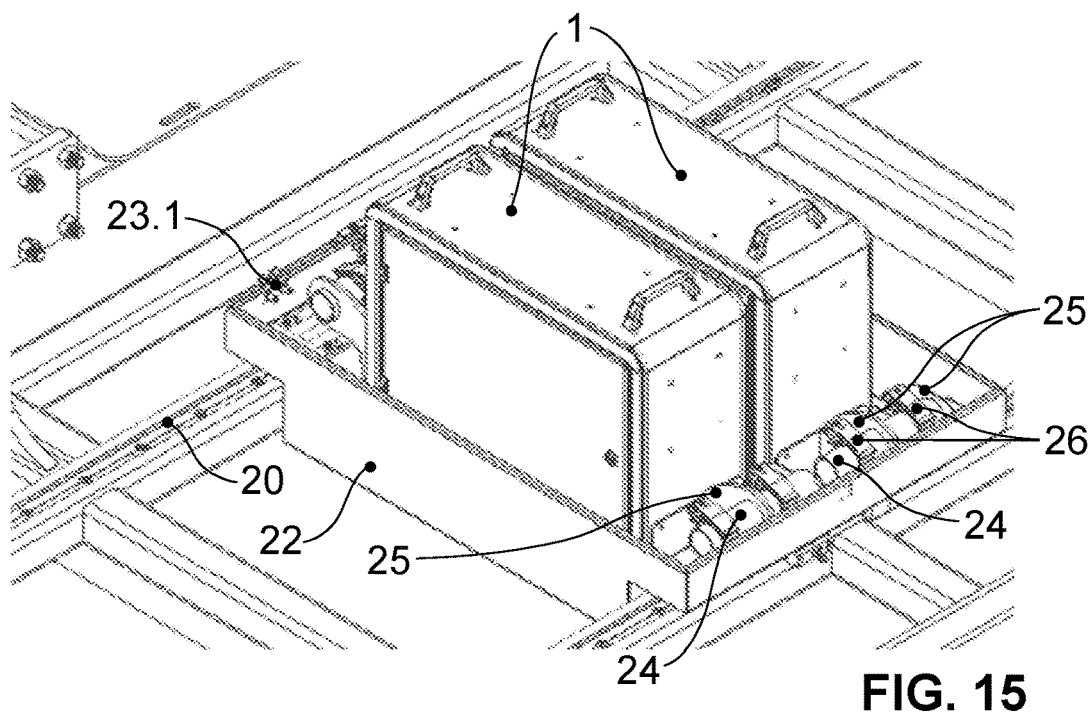
FIG. 15: details of the embodiment of the device for laser-based weed control with rail system on an agricultural vehicle trailer in perspective view from above.

The paired arrangement of the weed control modules 1 in the module protector 14 is illustrated in FIG. 14 and FIG. 15. The module protector 14, which comprises the module carrier 22 and the protector lid 23 which is hingedly attached to the module carrier 22 via the lid hinge 23.1, is shown semi-transparent in the closed state in FIG. 14 and in the open state (without protector lid 23) in FIG. 15.

The module rail 24, designed as a tubular or rod-shaped element, is attached to each of the two weed control modules 1 arranged parallel to one another-once to the front wall of the housing 8 and once to the rear wall of the housing 8—using the module rail holders 25. The sliding guide and clamping elements 26, designed as quick-release fasteners, are in turn attached to the module carrier 22. Each module rail 24 is guided and held in two sliding guide and clamping elements 26 so that it can be moved longitudinally. The module rail 24 can be locked in place by tightening the quick-release fasteners. The module rails 24 of the adjacent weed control modules 1 are aligned coaxially to one another on the front and rear sides of the housing.

Figure 16:
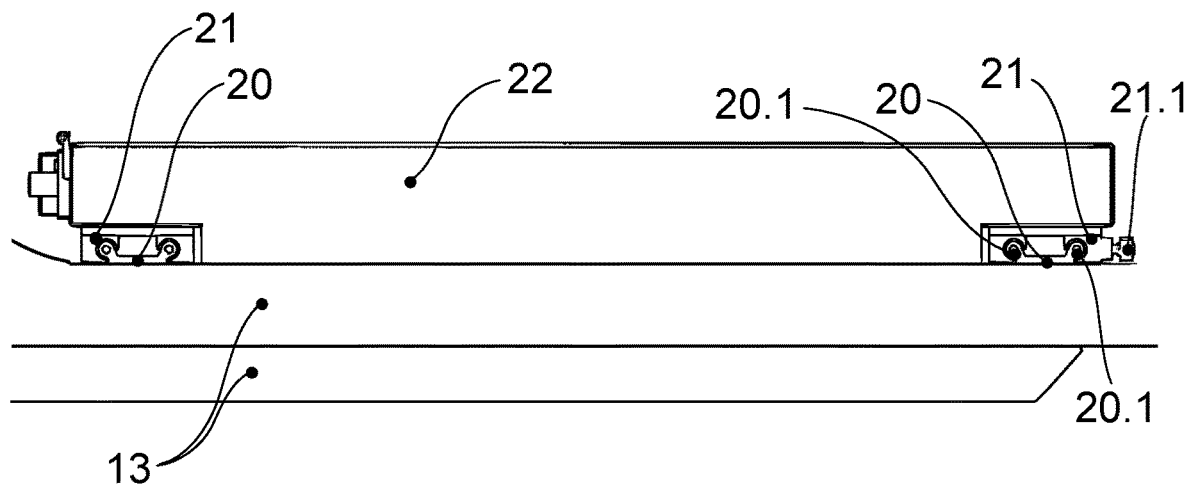
FIG. 16: details of the rail system on an agricultural vehicle trailer in longitudinal sectional view.
Figure 17:
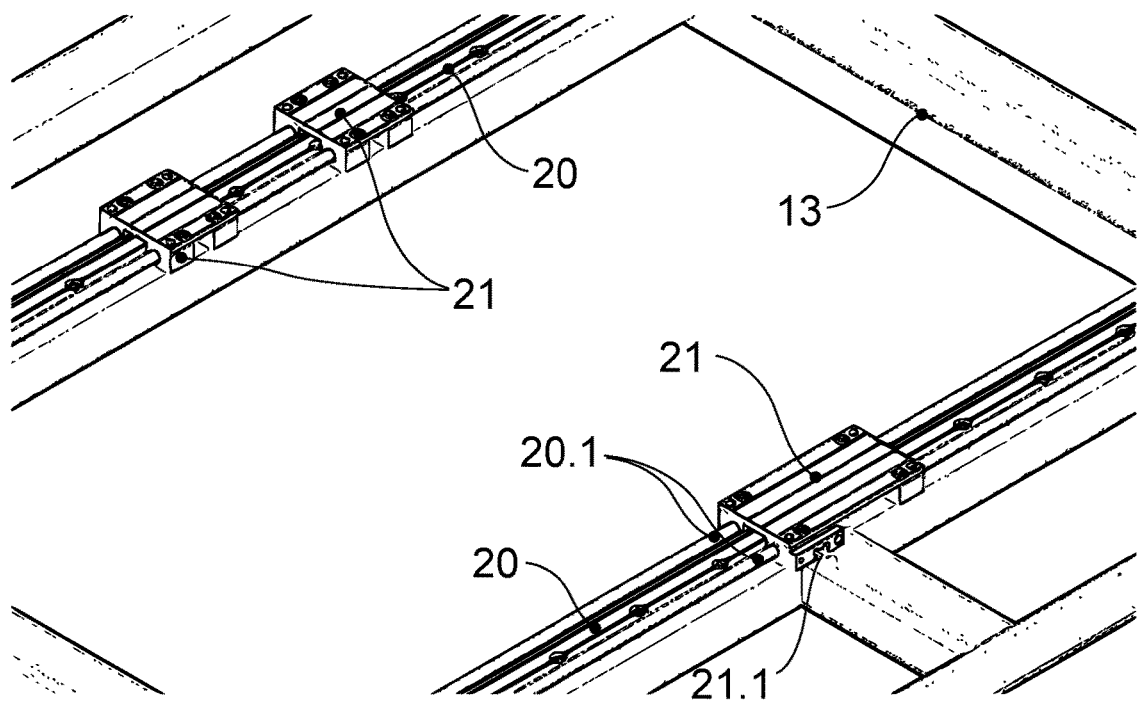
FIG. 17: details of the rail system on an agricultural vehicle trailer in perspective view from above.
Figure 18:
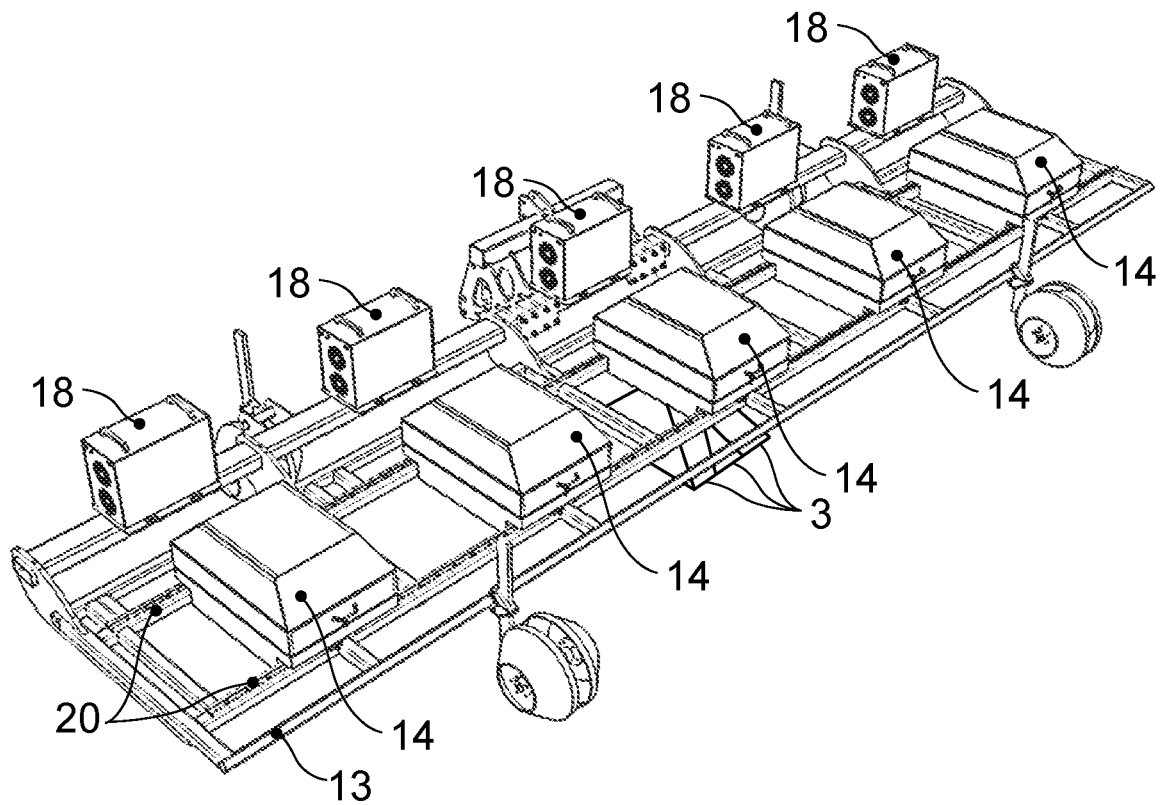
FIG. 18: an embodiment of the device for laser-based weed control on an agricultural vehicle trailer in perspective view.
Figure 19:
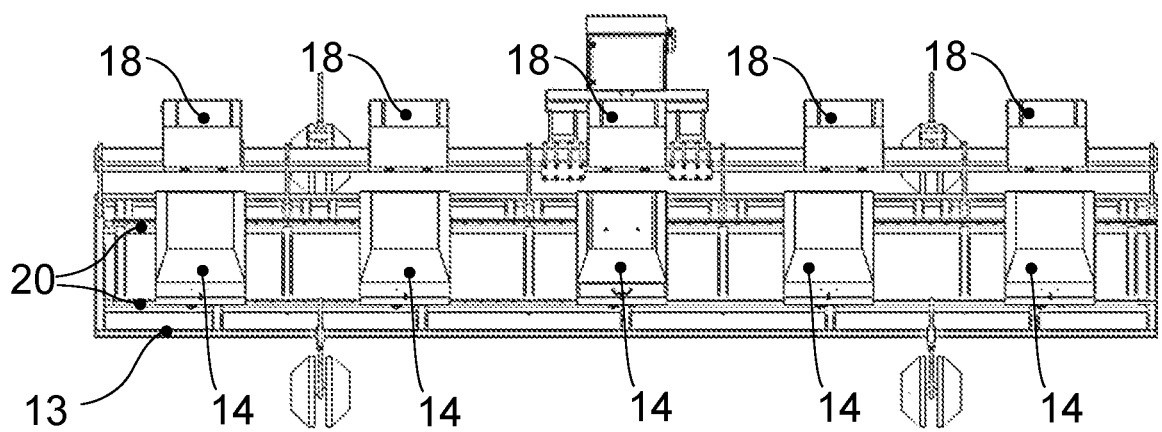
FIG. 19: an embodiment of the device for laser-based weed control on an agricultural vehicle trailer in perspective view.
Figure 20:
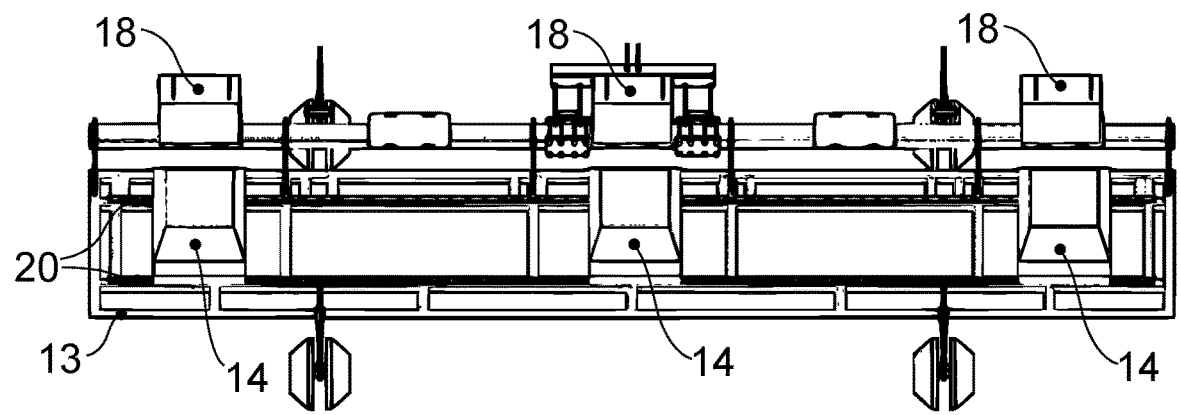
FIG. 20: an embodiment of the device for laser-based weed control on an agricultural vehicle trailer in perspective view.
Figure 21:
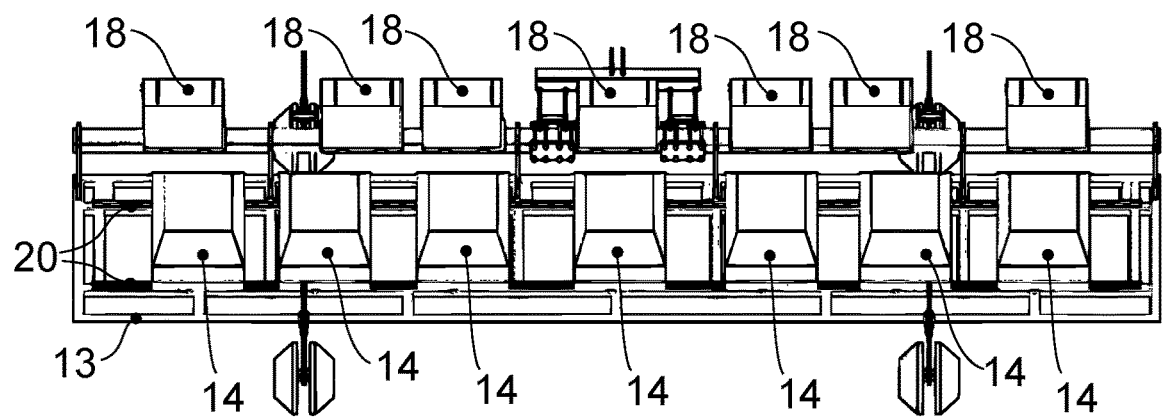
FIG. 21: an embodiment of the device for laser-based weed control on an agricultural vehicle trailer in perspective view.

In FIG. 16, which shows the rail system in a longitudinal section across the carrier rail tracks 20, as well as in FIG. 17, the detailed design of the two carrier rail tracks 20 is illustrated. Each carrier rail track 20 has a rail track made up of two parallel, interconnected carrier rails 20.1. The two carrier rails 20.1 form parts of the one-piece carrier rail track 20.

Each of the sliding shoes 21 is made up of sliding pieces that slide on the support rails and a connecting holding plate. One of the sliding shoes has a fastening element 21.1, which is designed as a locking screw, for locking. FIG. 17 also shows the three-point support for the module carrier 22. Two sliding shoes 21 are attached at a distance from one another on one of the two carrier rail tracks 20. On the other of the two carrier rail tracks 20, the slightly larger sliding shoe 21 is guided approximately in the middle between the other two sliding shoes 21 in projection. The latter sliding shoe 21 also has the fastener 21.1.

With regard to details of the rail system, reference is also made to the German utility model application with the application number DE 20 2023 101 842.4, the content of which is hereby incorporated into this patent application.

FIG. 18 to FIG. 21 show the device for laser-based weed control designed for agricultural use as a vehicle trailer and equipped with the rail system in different configurations with module protectors 14 and cooling units 18. The module protectors 14, each of which contains a pair of weed control modules 1, are adapted to different plant row spacings on the agricultural area 15. Each pair of weed control modules 1 located in a module protector 14 is assigned a cooling unit 18.

LIST OF REFERENCE NUMERALS 1 weed control module
2 stereo camera
3 image capture area
4 laser unit
4.1 laser optics
4.2 laser diode unit
5 laser beam
6 data processing and control unit
7 light guide
8 water cooling connection
9 housing
10 floor lighting panel
11 illuminant
12 protective curtain
13 chassis
14 module protector
15 agricultural area
16 crop
17 weed plant
18 cooling unit/water cooling unit
20 carrier rail track
20.1 carrier rail
21 sliding shoe
21.1 fastener
22 module carrier
23 protector lid
23.1 lid hinge
24 module rail
25 module rail holder
26 sliding guide and clamping element
α absorption coefficient
λ light wavelength

The invention claimed is:

1. Weed control module (1) for the selective control of weed plants (17) on an agricultural area (15) used for the agricultural cultivation of crops (16), comprising an image detection unit, a laser unit (4) and a data processing and control unit (6), wherein the laser unit (4) comprises a laser diode unit (4.2) for generating a laser beam (5) and a laser optics (4.1) coupled to the laser diode unit (4.2) via a light guide (7) for beam deflection and beam focusing of the laser beam (5), and the weed control module (1) further comprises a housing (9) accommodating and enclosing the image detection unit, the laser unit (4) and the data processing and control unit (6), characterized in that the image detection unit has a stereo camera (2) which is configured to photographically provide three-dimensional image data in a predetermined image capture area (3) on and above the agricultural area (15), the laser beam (5) generated by the laser diode unit (4.2) has a light wavelength (λ) in the range from 955 nm to 995 nm, and the data processing and control unit (6) is configured to use the three-dimensional image data provided by the stereo camera (2)

to detect weed plants (17) and distinguish them from crops (16) by means of an artificial intelligence integrated in the data processing and control unit (6) and trained on the basis of weed and crop image data, to identify at least one survival essential plant part for each weed plant (17) detected by means of the trained artificial intelligence integrated in the data processing and control unit (6) and to determine its position data, to target the identified survival essential plant part for each detected weed plant (17) by means of the laser optics (4.1) by controlling the laser optics (4.1) on the basis of the position data of the survival essential plant part, and after targeting the identified survival essential plant part for each detected weed plant (17), triggering the laser beam (5) for a predetermined irradiation time to eliminate the respective weed plant (17).

2. Weed control module (1) according to claim 1, characterized in that the laser beam (5) generated by means of the laser diode unit (4.2) has a power of at least 300 W.

3. Weed control module (1) according to claim 1, characterized in that the laser beam (5) generated by means of the laser diode unit (4.2) has a light wavelength (λ) in the range from 965 nm to 985 nm.

4. Weed control module (1) according to claim 1, characterized in that the size-determining housing (9) of the weed control module (1) lies within the geometric dimensions of a cuboid of 80 cm length, 80 cm width and 80 cm height.

5. Weed control module (1) according to claim 1, characterized in that the stereo camera (2) detects light in the visible spectral range.

6. Device for laser-based weed control, characterized in that the device comprises several of the weed control modules (1) according to claim 1.

7. Device for laser-based weed control according to claim 6, characterized in that the weed control modules (1) are installed on a self-driven or externally driven chassis (13) parallel to one another and in a row transverse to the direction of travel of the chassis (13).

8. Device for laser-based weed control according to claim 6, characterized in that it has a rail system for holding the laser-based weed control modules (1).

9. Device for laser-based weed control according to claim 8, characterized in that the rail system comprises two carrier rail tracks (20) which are aligned parallel to one another and form a carrier rail line, as well as one or more module carriers (22) guided by sliding shoes (21) which are longitudinally displaceable on the carrier rail tracks (20), wherein one or more of the weed control modules (1) are installed in each of the module carriers (22).

10. Device for laser-based weed control according to claim 6, characterized in that two weed control modules (1) are positioned next to each other in such a way that the image capture areas (3) of the stereo cameras (2) of these two weed control modules (1) overlap or touch.

11. A method for laser-based weed control, characterized in that the method is carried out with a weed control module (1) according to claim 1, wherein the weed control module (1) with the respective stereo camera (2) of the weed control module or modules (1) directed at the agricultural area (15) is moved over the agricultural area (15), and wherein the following steps are continuously repeated:

(a) photographic recording of images of the agricultural area (15) in the current image capture area (3) of the stereo camera (2) and processing the images into three-dimensional image data, (b) transmitting the three-dimensional image data to the data processing and control unit (6), (c) detecting weed plants (17) in the three-dimensional image data by means of the artificial intelligence integrated in the data processing and control unit (6) and trained on the basis of weed and crop image data, (d) identifying a survival essential plant part for each detected weed plant (17) by means of the trained artificial intelligence integrated in the data processing and control unit (6), (e) determining the position data of the identified survival essential plant part for each detected weed plant (17), and (f) eliminating all identified weed plants (17) in the cyclically repeated sub-steps:

(f1) selecting one of the identified weed plants (17) to be eliminated, (f2) transmitting the position data of the identified survival essential plant part of the selected weed plant (17) as target coordinates to the laser optics (4.1), (f3) targeting the identified survival essential plant part of the selected weed plant (17) using the laser optics (4.1), (f4) irradiating the identified survival essential plant part of the selected weed plant (17) by means of the laser beam (5) during a predetermined irradiation time.

12. A method for laser-based weed control according to claim 11, characterized in that the irradiation time for irradiating the survival essential plant part of the selected weed plant (17) is in the range from 10 ms to 50 ms.

* * * * *